G. CLAUDE.
MANUFACTURE OF HYDROGEN.
APPLICATION FILED MAR. 25, 1913.
1,135,355.
Patented Apr. 13, 1915.
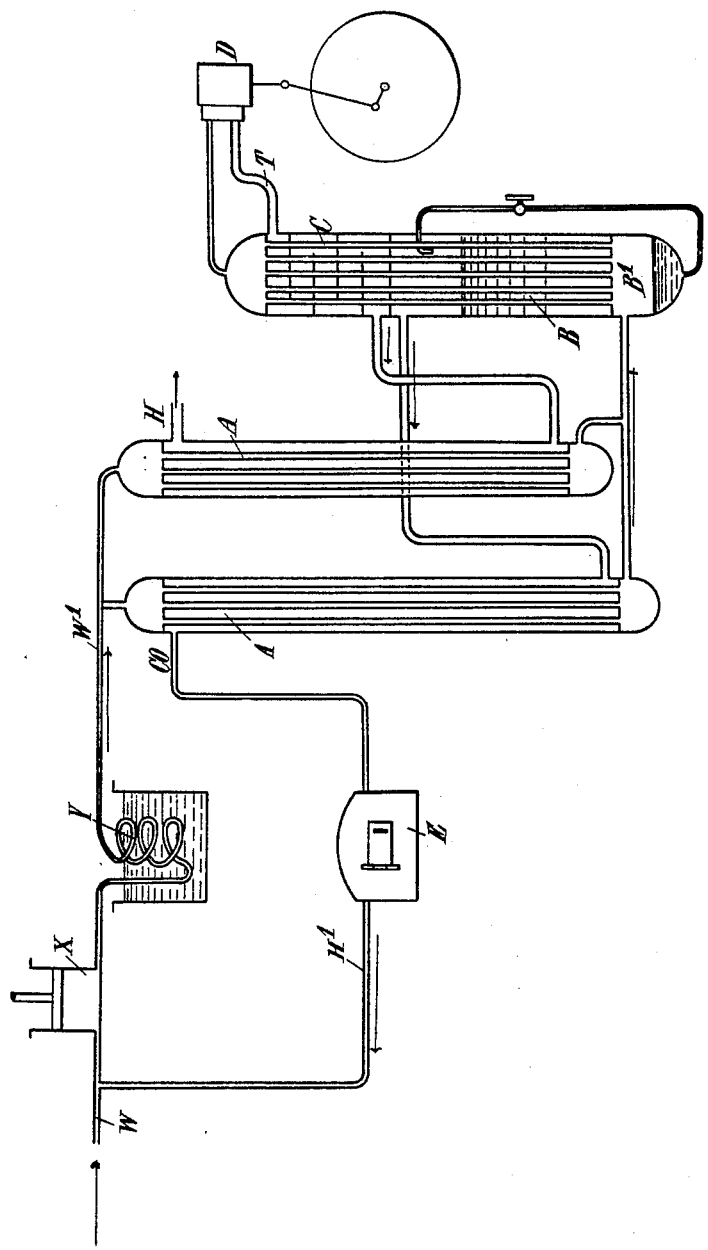

UNITED STATES PATENT OFFICE.

GEORGES CLAUDE, OF PARIS, FRANCE, ASSIGNOR TO SOCIÉTÉ L'AIR LIQUIDE (SOCIETE ANONYME POUR L'ETUDE ET L'EXPLOITATION DES PROCEDES GEORGES CLAUDE), OF PARIS, FRANCE.

MANUFACTURE OF HYDROGEN.

1,135,355.  Specification of Letters Patent.  Patented Apr. 13, 1915.

Application filed March 25, 1913. Serial No. 756,806.

*To all whom it may concern:*

Be it known that I, GEORGES CLAUDE, a citizen of the Republic of France, residing at 48 Rue St. Lazare, Paris, in the Republic of France, have invented certain new and useful Improvements Relating to the Manufacture of Hydrogen, of which the following is a specification.

This invention relates to the manufacture of hydrogen and has reference to a method of production such as disclosed in the specification of the French Patent No. 329839, that is to say by a process of partial liquefaction. The process described in the specification referred to enables hydrogen of a high degree of purity, namely ninety-nine per cent. or more, to be obtained from purified water gas, but, although the process yields hydrogen of such great purity, it is open to objection in that, even theoretically, the maximum volume of hydrogen obtainable is only equal to one half the volume of water gas employed. In practice, this defect is intensified owing to a large part of the hydrogen being held in solution in the carbon monoxid, and also owing to the fact that, in order to avoid having to make an excessively minute adjustment at the exit cock for the liquefied carbon monoxid escaping from the liquefying apparatus, this cock is generally opened wider than is theoretically correct.

The chief objects of the present invention are to treat the water gas at disposal in such a way as to obtain a volume of very pure hydrogen equal to the sum of the volumes of the hydrogen and carbon monoxid components of the water gas, and to eliminate or reduce the need for minute adjustment of the liquefying apparatus.

According to the present invention the carbon monoxid separated from the water gas by a process of partial liquefaction, such as the process described in the French patent specification above mentioned, is subjected to a chemical reaction in which it is utilized to produce an approximately equal volume of hydrogen, and this hydrogen is then added to the further quantities of water gas to be treated. A convenient reaction of this kind is that between carbon monoxid and heated calcium hydrate since the volume of hydrogen gas resulting from this process is approximately equal (at the same temperature and pressure) to the volume of carbon monoxid gas used. The formula representing this reaction is:—

$$CO + Ca(OH)_2 = CaCO_3 + H_2.$$

The direct production of hydrogen from water gas by subjecting the latter to a reaction in which the carbon monoxid component is utilized to produce an equivalent amount of hydrogen has already been proposed, as also has the purification of the hydrogen by a process of liquefaction. In such cases of direct production, however, great precautions have to be taken to obtain good results, and in view of the difficulties to be overcome it has been proposed to subject the hydrogen so obtained to a process of liquefaction in order to purify it, whereas by the present process it is comparatively unimportant that the hydrogen obtained as an equivalent of the carbon monoxid used should approach in purity that demanded industrially at the present day, because the hydrogen so obtained is not collected and used as such, but is mixed with water gas and subjected to the process of partial liquefaction above referred to, which process yields very pure hydrogen, as already stated. Moreover in prior processes the gas subjected to the process in which carbon monoxid is utilized to produce an equivalent amount of hydrogen is water gas, whereas in the present process the gas thus treated is almost exclusively carbon monoxid. Consequently the volume of gas requiring treatment in the prior processes is about double the volume requiring treatment in the present process for the same yield of hydrogen, and the apparatus containing the lime or equivalent reacting substance need, therefore, be only about half as large in the present case as in the prior cases; also the production of the hydrogen is considerably facilitated, chemically, by the absence of hydrogen from the gas to be treated. Hence the greater permissible latitude in the course of the reaction and in the temperature adopted is a characteristic of the present process. Furthermore, it is of small importance if a comparatively large quantity of hydrogen dissolved in the carbon monoxid escapes with the latter because this hydrogen in addition to that obtained as an equivalent of the carbon monoxid used is afterward subjected to the process of partial liquefaction by which the hydrogen is ultimately obtained pure.

It is true that for the carrying out of the process of partial liquefaction it is necessary to compress not merely the water gas at disposal but the water gas and the hydrogen obtained as an equivalent of the carbon monoxid, the ratio of the volumes of the gases in the two cases being about one to one and a half, but this drawback is much more than compensated for by the advantages of the present process.

It will be noted that the nitrogen that the water gas always contains in greater or smaller proportions accumulates slowly; as soon as this nitrogen attains a prejudicial proportion, it must be removed for example, by opening a valve and allowing it to be driven out of the apparatus.

In the accompanying diagrammatic drawing it is seen that the water gas to be treated passes through a pipe W to the compressor X and thence to a cooling device illustrated symbolically by a water immersed coil Y, whence it passes by the pipe $W^1$ to two temperature exchangers A A. From these exchangers the compressed and cooled water gas passes upward through the tubes of a carbon monoxid separator B C. The lower ends of the tubes are surrounded by the liquid carbon monoxid collected in a chamber $B^1$ under pressure and thence discharged into the part B under atmospheric or less pressure; the upper ends of the tubes are surrounded by the hydrogen resulting from the separation and expanded in an expansion engine D. The hydrogen circulated in the part C of the separator passes through one of the exchangers A and thence escapes by a pipe H, and the vaporized carbon monoxid from the part B of the separator passes through the other exchanger and thence escapes by a pipe C O. This carbon monoxid then passes into a chamber E where the reaction between the carbon monoxid and calcium hydrate takes place, and the resultant hydrogen passes by way of the pipe $H^1$ to the pipe W to mix with the incoming water gas.

In conclusion, it may be briefly stated that the invention considered as a complete and continuous process, involving the chemical and also the physical operations described, enables a volume of very pure hydrogen to be obtained from an approximately equal volume of water gas under conditions affording great convenience and simplicity, and great latitude as regards the exactitude of adjustment of the apparatus employed.

Although the process has been described as applied only to water gas, it will be understood that other gaseous mixtures containing hydrogen and amenable to similar treatment are intended to be included within the scope of this invention.

What I claim and desire to secure by Letters Patent of the United States is:—

1. In the manufacture of hydrogen from water gas by a process of partial liquefaction, utilizing the carbon monoxid resulting from the partial liquefaction to liberate hydrogen from a substance containing the same, and adding the hydrogen so produced to the further quantities of water gas to be treated.

2. In the manufacture of hydrogen from water gas by a process of partial liquefaction, chemically utilizing the carbon monoxid resulting from the partial liquefaction to liberate an approximately equal volume of hydrogen from a substance containing the same, and adding this hydrogen to the further quantities of water gas to be treated.

3. In the manufacture of hydrogen from water gas by a process of partial liquefaction, subjecting the carbon monoxid resulting from the partial liquefaction to the action of heated calcium hydrate, and adding the hydrogen resulting from this action to the further quantities of water gas to be treated.

4. A process for the manufacture of hydrogen, consisting in subjecting compressed and cooled water gas to a process of partial liquefaction whereby the hydrogen escapes as gas and the carbon monoxid collects as liquid, removing the liquefied carbon monoxid, vaporizing it, utilizing the vapor to liberate hydrogen from a substance containing the same, and adding the liberated hydrogen to the further quantities of water gas to be treated.

In testimony whereof I affix my signature in presence of two witnesses.

GEORGES CLAUDE.

Witnesses:
  PIERRE HOURLIER,
  LUCIEN MEMMINGER.

Copies of this patent may be obtained for five cents each, by addressing the "Commissioner of Patents, Washington, D. C."